US012764511B2

(12) United States Patent
Khan et al.

(10) Patent No.: US 12,764,511 B2
(45) Date of Patent: Oct. 13, 2026

(54) SYSTEMS AND METHODS FOR PRIORITY HANDLING FOR SESSION INITIATION PROTOCOL MESSAGES ASSOCIATED WITH TEXT MESSAGES SENT TO AN EMERGENCY NUMBER

(71) Applicant: Verizon Patent and Licensing Inc., Basking Ridge, NJ (US)

(72) Inventors: Kashif Khan, Keller, TX (US); Shawn R. Pugh, Easton, PA (US); Shujaat Ali Siddique, Hillsborough, NJ (US); John Cao Vinh Nguyen, Trophy Club, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 344 days.

(21) Appl. No.: 18/528,107

(22) Filed: Dec. 4, 2023

(65) Prior Publication Data

US 2025/0184704 A1 Jun. 5, 2025

(51) Int. Cl.

| | |
|---|---|
| *H04W 4/90* | (2018.01) |
| *H04L 65/1016* | (2022.01) |
| *H04L 65/1104* | (2022.01) |
| *H04W 4/14* | (2009.01) |

(52) U.S. Cl.
CPC ........... *H04W 4/90* (2018.02); *H04L 65/1016* (2013.01); *H04L 65/1104* (2022.05); *H04W 4/14* (2013.01)

(58) Field of Classification Search
CPC ... H04W 4/90; H04L 65/1104; H04L 65/1016
USPC .................................................... 455/404.01
See application file for complete search history.

(56) References Cited

U.S. PATENT DOCUMENTS

| | | | | |
|---|---|---|---|---|
| 2020/0374321 | A1* | 11/2020 | Sridhar | H04L 61/4535 |
| 2022/0131907 | A1* | 4/2022 | Bianconi | H04L 65/1016 |
| 2023/0370851 | A1* | 11/2023 | Filart | H04W 12/06 |
| 2025/0113170 | A1* | 4/2025 | Kuoppamaki | H04M 1/72436 |

* cited by examiner

*Primary Examiner* — Maria El-Zoobi

(57) ABSTRACT

In some implementations, a call session control function (CSCF) may receive, from a user equipment (UE), a message associated with a text message sent from the UE to an emergency number. The CSCF may add, based on the message being associated with the text message sent to the emergency number, an enhanced 911 (e911) attribute to the message, wherein the e911 attribute provides prioritized handling for the message during network congestion in relation to messages without the e911 attribute. The CSCF may transmit the message having the e911 attribute.

20 Claims, 9 Drawing Sheets

SYSTEMS AND METHODS FOR PRIORITY HANDLING FOR SESSION INITIATION PROTOCOL MESSAGES ASSOCIATED WITH TEXT MESSAGES SENT TO AN EMERGENCY NUMBER

BACKGROUND

Wireless communication systems are widely deployed to provide various telecommunication services such as telephony, video, data, messaging, and broadcasts. A wireless network may include one or more network nodes that support communication for wireless communication devices, such as a user equipment (UE).

DETAILED DESCRIPTION OF EXAMPLE EMBODIMENTS

Figure 1:
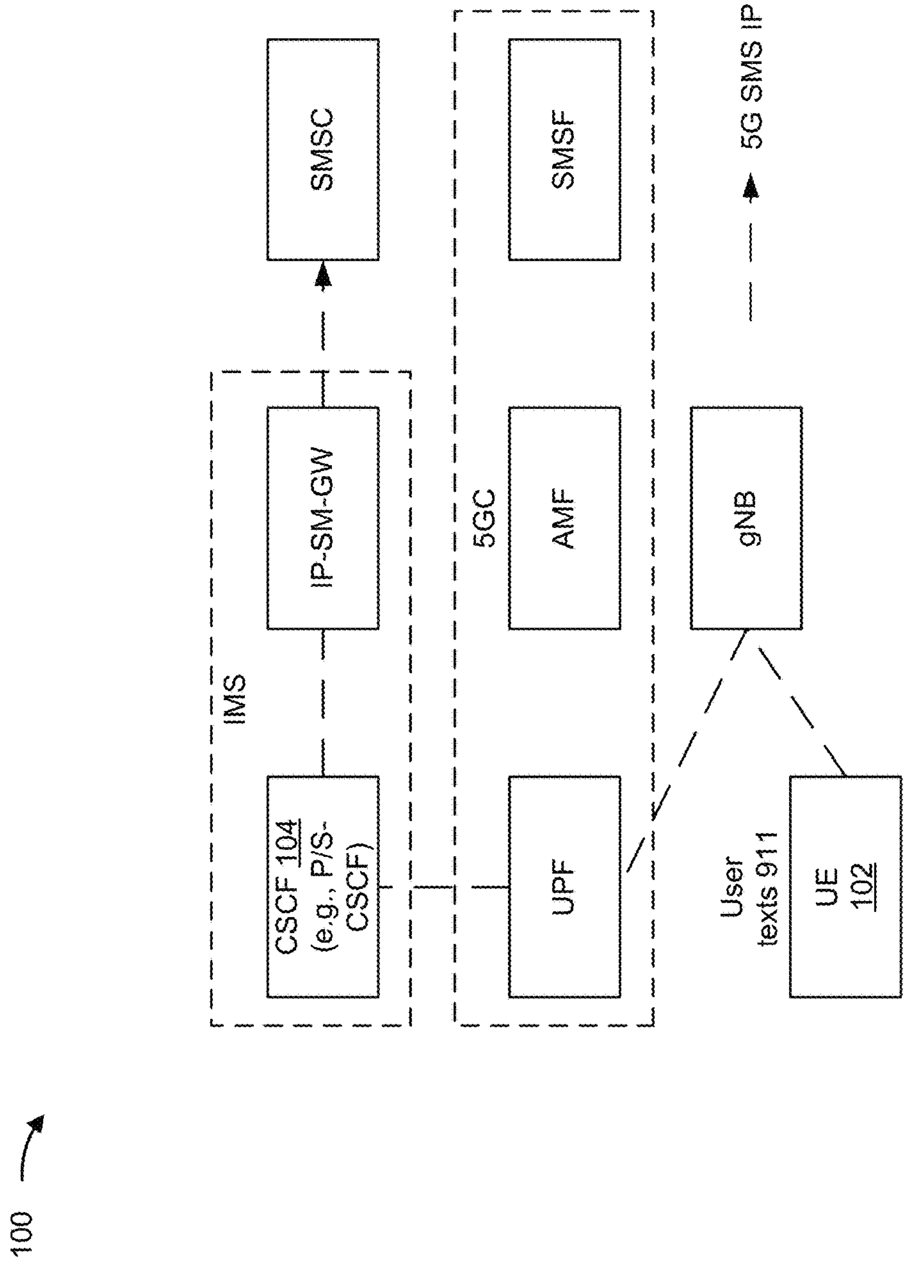
FIG. 1 is a diagram of an example associated with an enhanced end-to-end (E2E) overload handling of short messaging service (SMS) text 911 messages using a resource priority header (RPH) with an emergency services network (esnet) namespace.

The following detailed description of example implementations refers to the accompanying drawings. The same reference numbers in different drawings may identify the same or similar elements.

In situations where a user may or may not be able to directly place a voice emergency call to 911, service providers have introduced the ability to send a text message to 911 during an emergency. The user may send the text message to 911 via a UE. Such a feature is sometimes referred to as SMS text 911 and the feature may be useful when the user is unable to dial the number 911.

However, when a wireless network that directs the text message (e.g., an originating network) is overloaded, the text message may not have end-to-end overload handling among the various network elements in the wireless network. As a result, the text message may be treated similarly to other text-based related messages, and thus, may be dropped in case of network overload. Further, a Next Generation PSAP may not be able to determine whether a received SMS text 911 is from a valid user or not because a mechanism to prevent identity spoofing for text 911 may not exist, for example.

In some implementations, a mechanism may be defined to ensure that 911 text messaging receives priority handling in a wireless network. When a text message is determined as being associated with "SMS text 911", the text message may be marked accordingly, such that in all subsequent steps through the network the text message may receive preferential treatment in the case of network overload. The text message may be marked with an enhanced 911 (e911) attribute, which may allow the text message to receive preferential treatment in the case of network overload. In a specific example, an RPH with an esnet namespace may be used to ensure that the 911 text messaging receives priority handling. A namespace may be a declarative region that provides a scope to identifiers (e.g., the names of types, functions, and/or variables) within the declarative region. Once the text message is received using a message, such as a SIP message, at a proxy call session control function (CSCF) (P-CSCF) in the wireless network, the P-CSCF may insert the e911 attribute in the message. Each network element may be able to detect the e911 attribute and use its internal overload control to provide preferential treatment to the text message when the wireless network is overloaded. The mechanism may be compatible with a traditional SMS architecture and an RCS architecture. Further, text messages may be given priority based on the types of users that initiate the text messages. For example, text messages associated with police officers or persons serving in a critical public safety position may receive preferential treatment.

In some implementations, for a traditional SMS architecture, an SMS application server (SMS-AS) may be enhanced to include an optional parameter in a short message peer-to-peer (SMPP) protocol to support the passing of an emergency indication, as indicated in the RPH with the esnet namespace. Similarly, the SMS-AS may map an optional parameter in the SMPP protocol to the corresponding RPH esnet namespace for SIP signaling and session priority attribute value pair (AVP) for diameter signaling. For an SMS RCS solution, an RCS application server (AS) and all Internet Protocol multimedia subsystem (IMS) network elements within an RCS flow may be enhanced to give higher priority to SIP messages with the RPH with the esnet namespace, as compared to other SIP messages.

In some implementations, for an IMS IP based network that supports a SIP interface, a Next Generation PSAP center may be able to detect spoofing of text messages, where the text messages may be based on SMS text 911. Spoofing may be detected using a STIR/SHAKEN framework. The STIR/SHAKEN framework may be applied for RCS-based SMS text 911. In addition to caller identity verification, the RPH may be verified, since the RPH may also be spoofed.

In some implementations, by supporting the e911 attribute (e.g., the RPH with the esnet namespace) in SIP messages, reliability of SMS text 911 may be improved when the wireless network is overloaded. Further, by implementing the STIR/SHAKEN framework for the text messages, spoofing of SMS text 911 at the Next Generation PSAP center may be reduced, thus allowing a PSAP operator to focus on actual emergency situations.

FIG. 1 is a diagram of an example 100 associated with an enhanced E2E overload handling of SMS text 911 messages using an RPH with an esnet namespace in a 5G system. As shown in FIG. 1, example 100 includes a UE 102, a gNB, a user plane function (UPF), an access and mobility management function (AMF), a short messaging service function (SMSF), a CSCF 104 (e.g., a P-CSCF and/or a serving CSCF (S-CSCF)), an IP short message (SM) gateway (IP-SM-GW), and a short messaging service center (SMSC). The UPF, the AMF, and the SMSF may be associated with a 5G core (5GC). The CSCF 104 and the IP-SM-GW may be associated with an IMS.

As shown in FIG. 1, in a 5G SMS over IP solution (traditional SMS and RCS messaging), the UE 102 may initiate a text message associated with SMS text 911. The text message may be routed from the UE 102 to the gNB, the UPF, and the CSCF 104 via a SIP message. The CSCF 104 may detect that the text message is associated with SMS text 911, in which case the CSCF 104 may add an e911 attribute into the SIP message (or any type of message exchanged between network functions in a network). In one example, the e911 attribute added to the SIP message may be an RPH with an esnet namespace. In other words, the CSCF 104 may receive, from the UE 102, the SIP message associated with the text message sent to an emergency number (e.g., 911). The CSCF 104 may add the e911 attribute into the SIP message. The CSCF 104 may transmit the SIP message having the e911 attribute. The SIP message may be routed to the IP-SM-GW, and then to the SMSC. Priority handling may be applied at the SMSC to the SIP message based on the e911 attribute, which may ensure that all network elements within the IMS give the highest priority handling to the SIP message.

As indicated above, FIG. 1 is provided as an example. Other examples may differ from what is described with regard to FIG. 1. The number and arrangement of devices shown in FIG. 1 are provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
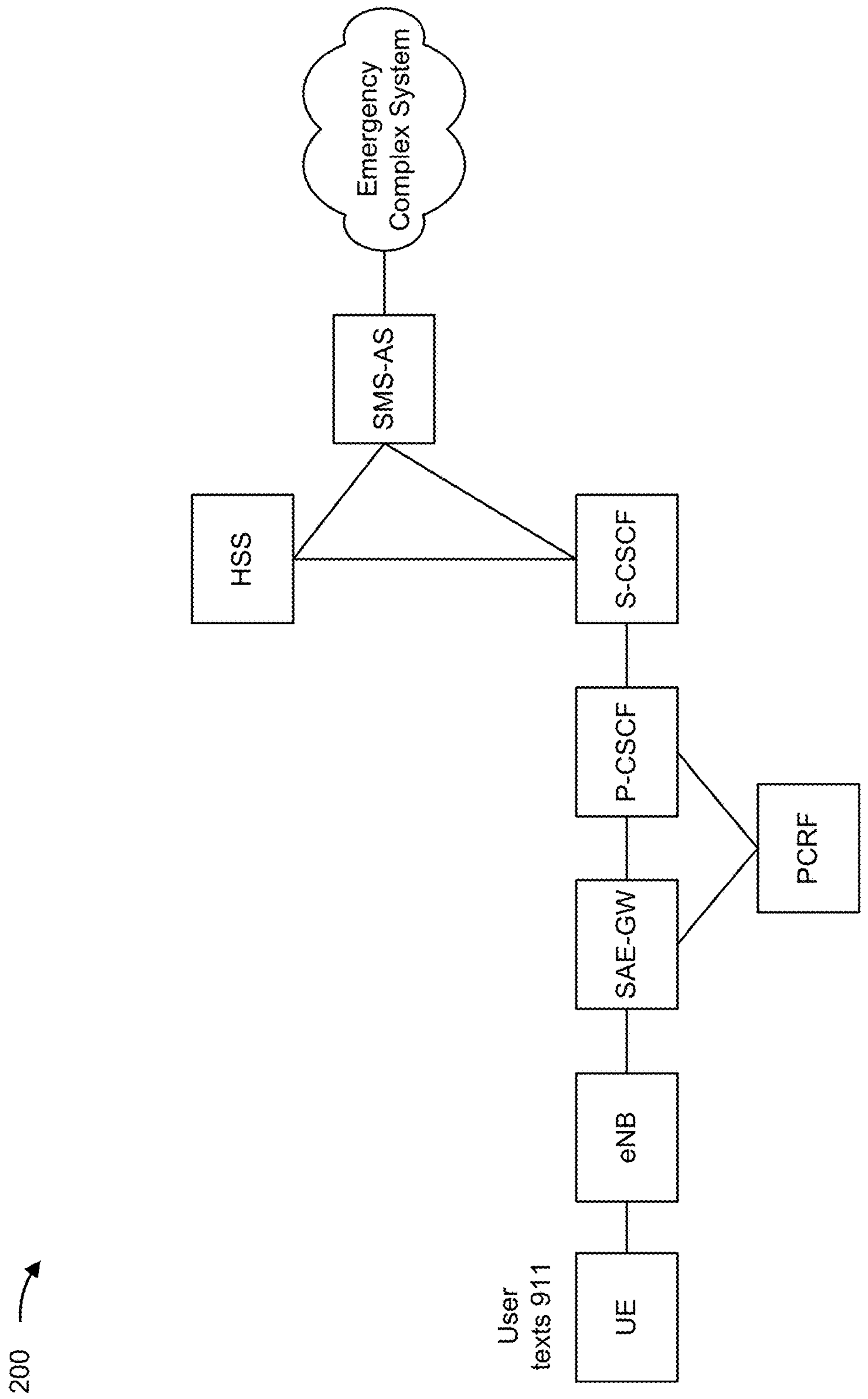
FIG. 2 is a diagram of an example associated with an E2E overload handling of SMS text 911 messages using an RPH with an esnet namespace.

FIG. 2 is a diagram of an example 200 associated with an enhanced E2E overload handling of SMS text 911 messages using an RPH with an esnet namespace in a Fourth Generation (4G) system. As shown in FIG. 2, example 200 includes a UE, a gNB, a mobility management entity (MME), a system architecture evolution (SAE) gateway, a policy and charging rules function (PCRF), a P/S-CSCF, a home subscriber server (HSS), an SMS-AS, and an emergency complex system.

As shown in FIG. 2, the UE may initiate a text message associated with SMS text 911. The text message may be routed from the UE to the gNB and the P/S-CSCF via a message, such as a SIP message. The P/S-CSCF may detect that the text message is associated with SMS text 911, in which case the P/S-CSCF may add an e911 attribute (e.g., an RPH with an esnet namespace) into the SIP message. In other words, the P/S-CSCF may insert the e911 attribute into the SIP message, which may ensure that all subsequent network elements within an IMS will give the highest priority handling to the SIP message. The e911 attribute may indicate that the SIP message should be handled with priority handling. The P/S-CSCF may add the e911 attribute, and other entities may handle the SIP message with priority based on the e911 attribute.

As indicated above, FIG. 2 is provided as an example. Other examples may differ from what is described with regard to FIG. 2. The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
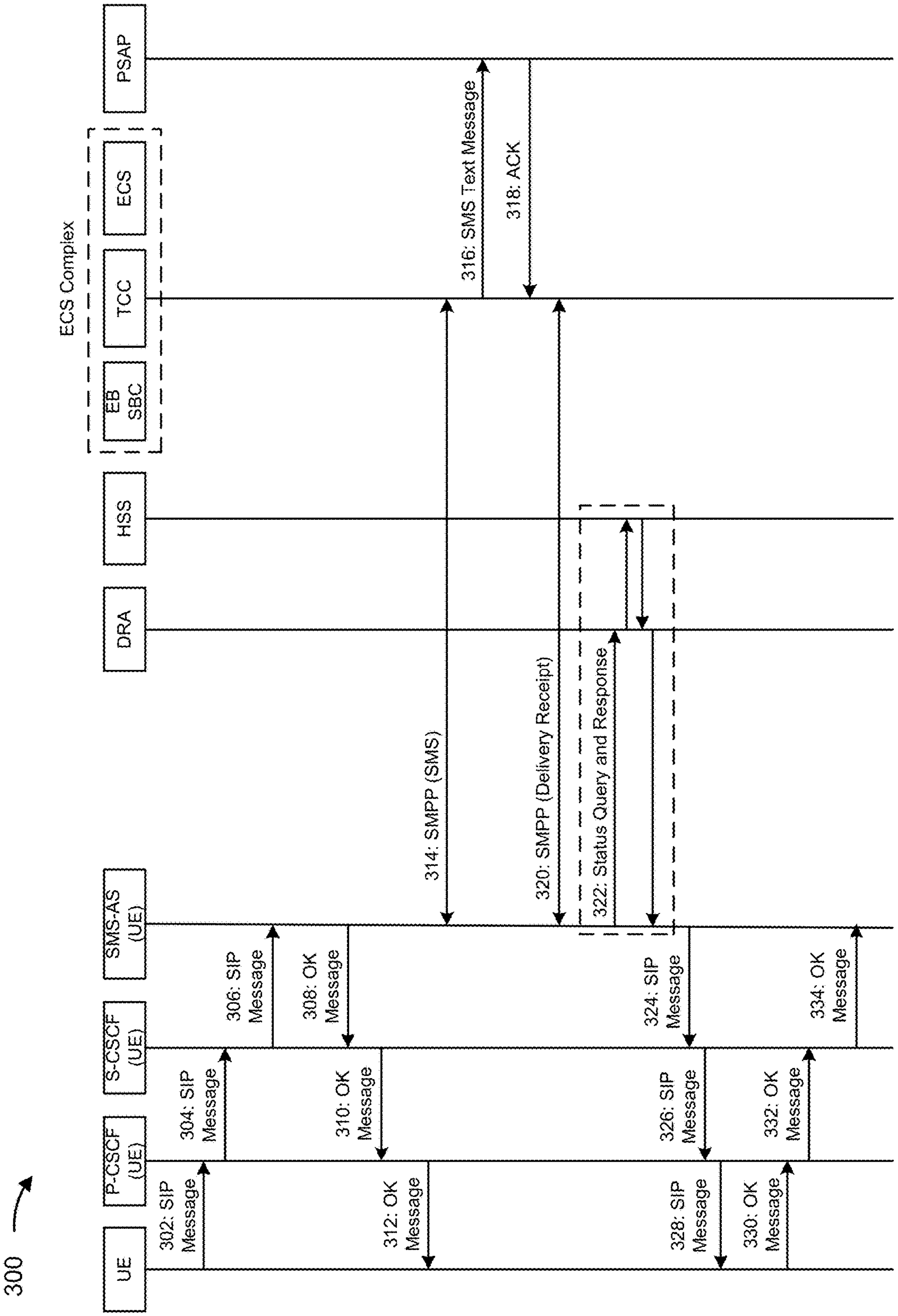
FIG. 3 is a diagram of an example associated with an emergency text to a public safety answering point (PSAP) from a UE using a session initiation protocol (SIP) message via an SMS-application server (AS).

FIG. 3 is a diagram of an example associated with an emergency text to a PSAP from a UE using a SIP message via an SMS-AS. As shown in FIG. 3, example 300 includes a UE (AT1, in the description below), a P-CSCF, an S-CSCF, an SMS-AS, a diameter routing agent (DRA), an HSS, an emergency communication system (ECS), and a PSAP.

In some implementations, the UE may attach to an emergency packet data network (PDN) and perform an emergency SIP registration after completing an IMS SIP registration. Such signaling may be transmitted over a 4G or 5G PDN when the UE detects a text message sent to an emergency number (e.g., 911) and generates a SIP message, where the text message may be an SMS emergency text message. As shown by reference number 302, the UE may transmit the SIP message to the P-CSCF. The SIP message may indicate a content type (e.g., application/vnd.3gpp (or 3gpp2).sms). The SIP message may indicate an SMS encapsulated SMS peer-to-peer (P2P). The SIP message may indicate a request uniform resource identifier (R-URI) (e.g., urn:service:sos or 911). The SIP message may indicate that the SIP message is to 911 (To:911). The SIP message may indicate that the SIP message is from the UE (From:AT1). The SIP message may indicate that a preferred identity is the UE (P-Preferred-Identity:AT1). The P-CSCF may convert the R-URI of urn:service:sos to tel:911 when the UE sends such R-URI in the SIP message. The P-CSCF may convert the preferred identity to a P-Asserted-Identity (PAI) header (PAI:AT1). The P-CSCF may route the SIP message to the same S-CSCF that was used for an IMS SIP registration. Further, since the SIP message is associated with SMS text 911, the P-CSCF may add an e911 attribute, such as an RPH with an esnet namespace, in the SIP message.

As shown by reference number 304, the P-CSCF may transmit the SIP message to the S-CSCF. The SIP message may include the RPH with the esnet namespace. As shown by reference number 306, the S-CSCF may transmit, to the SMS-AS, the SIP message having the RPH with the esnet namespace. The SIP message may be routed to the SMS-AS (or SMSC) using initial filter criteria (iFC). The SMS-AS may detect that the SIP message has the RPH with the esnet namespace. The SMS-AS may give priority handling to these messages when a wireless network is overloaded. In other words, when the wireless network is overloaded, these messages may receive the highest priority.

As shown by reference number 308, the SMS-AS may transmit an OK message (e.g., SIP 200 OK) to the S-CSCF. The OK message may indicate {To:911, From:AT1, PAI:AT1}. As shown by reference number 310, the S-CSCF may transmit the OK message to the P-CSCF. As shown by reference number 312, the P-CSCF may transmit the OK message to the UE.

As shown by reference number 314, the SMS-AS may route the SIP message to the ECS for subsequent delivery to the PSAP. When the wireless network is overloaded, the SMS-AS may route the SIP message using the highest priority. When the wireless network is under normal conditions, the SMS-AS may route the SIP message using a normal priority. The SMS-AS may route the SIP message to the ECS since the SIP message is associated with the text message. Since the SIP message is associated with the text message, the SMS-AS may insert an optional parameter in an SMPP message to indicate SMS text 911 (e.g., mapping of the RPH esnet to the optional parameter). The SMS-AS may transmit the SMPP message to the ECS. The ECS may select an appropriate PSAP following a proper location-based services (LBS) procedure. As shown by reference number 316, the ECS may transmit the text message to the PSAP.

As shown by reference number 318, the PSAP may transmit an acknowledgement to the ECS. As shown by reference number 320, the ECS may transmit an SMPP (delivery receipt) message to the SMS-AS, which may include an optional parameter indicating the priority handling.

As shown by reference number 322, the SMS-AS may transmit a status query (user authorization request) with a session priority AVP to the DRA. The DRA may transmit the status query with the session priority AVP to the HSS. The HSS may transmit a status query response (user authorization answer) to the DRA. The DRA may transmit the status query response to the SMS-AS. The SMS-AS may query the HSS to determine a proper CSCF to which to send a subsequent SIP message. The SMS-AS sends the status query to the DRA, which determines the proper HSS to get the status query. Since there is an optional parameter indicating priority handling, the SMS-AS may insert the session priority AVP.

As shown by reference number 324, the SMS-AS may transmit a SIP message to the S-CSCF. The SIP message may indicate a delivery acknowledgement/report. Further, the SIP message may indicate {To:AT1, From:911, PAI:AT1, RPH esnet}. As shown by reference number 326, the S-CSCF may transmit the SIP message to the P-CSCF. The S-CSCF may use an IMS registration of the UE established over the IMS PDN to deliver the SIP message. As shown by reference number 328, the P-CSCF may transmit the SIP message to the UE.

As shown by reference number 330, the UE may transmit an OK message (e.g., SIP 200 OK) to the P-CSCF. The OK message may indicate {To:AT1, From:911, PAI:AT1}. As shown by reference number 332, the P-CSCF may transmit the OK message to the S-CSCF. As shown by reference number 334, the S-CSCF may transmit the OK message to the SMS-AS.

As indicated above, FIG. 3 is provided as an example. Other examples may differ from what is described with regard to FIG. 3. The number and arrangement of devices shown in FIG. 3 are provided as an example. In practice, there may be additional devices, fewer devices, different devices, or differently arranged devices than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) shown in FIG. 3 may perform one or more functions described as being performed by another set of devices shown in FIG. 3.

Figure 4:
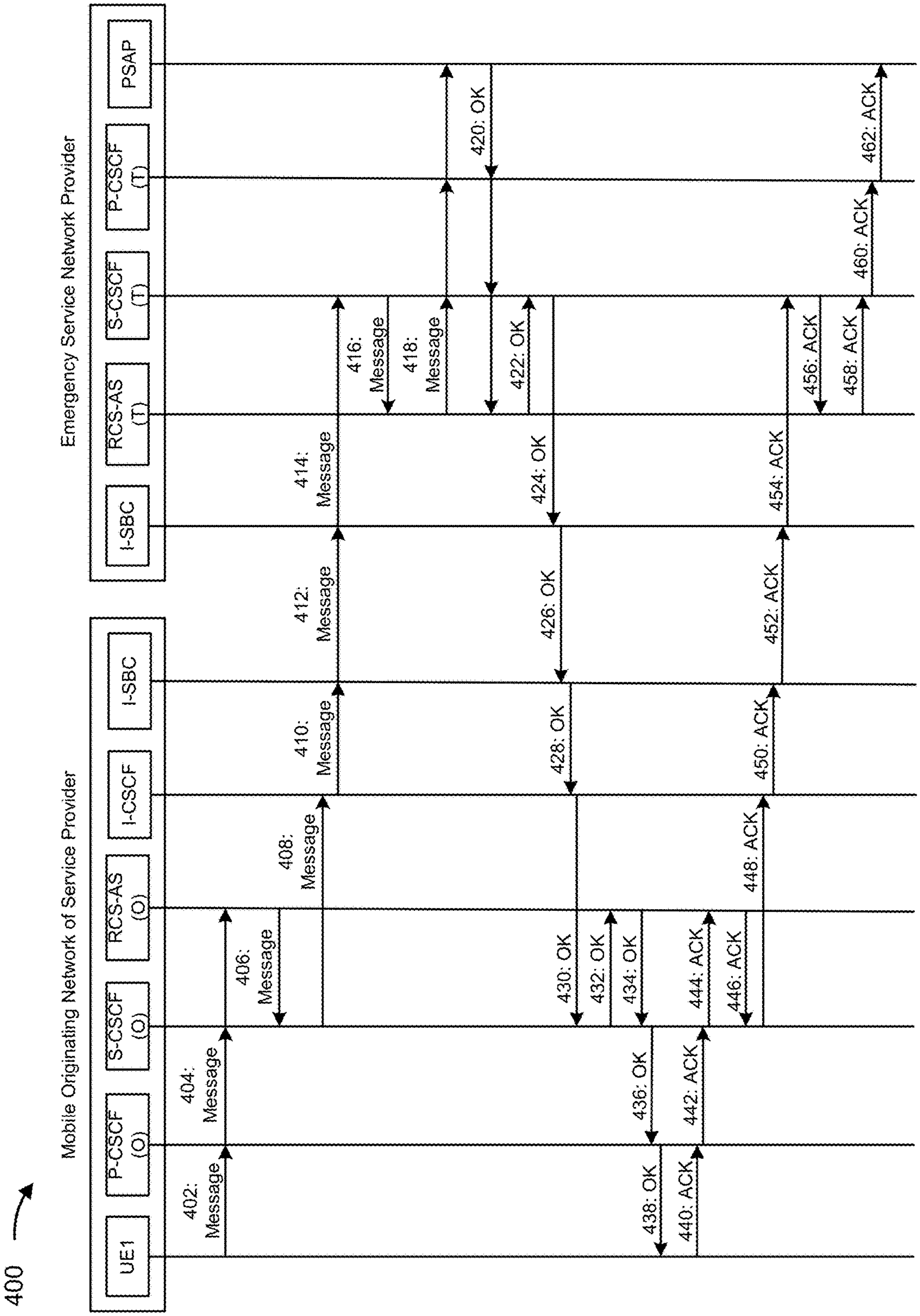
FIG. 4 is a diagram of an example associated with an emergency text from a UE using a SIP message via a rich communication service (RCS)-AS for an Internet Protocol (IP) based PSAP.

FIG. 4 is a diagram of an example 400 associated with an emergency text from a UE using a SIP message via an RCS-AS for an IP-based PSAP. As shown in FIG. 4, example 400 includes a UE, a first P-CSCF, a first S-CSCF, a first RCS-AS, an interrogating CSCF (I-CSCF), and a first interconnect session border controller (I-SBC), which may be associated with a mobile originating (O) network of a service provider. Example 400 further includes a second I-SBC, a second RCS-AS, a second S-CSCF, a second P-CSCF, and a PSAP, which may be associated with an emergency service network provider (terminating network (T)).

As shown by reference number 402, the UE may transmit a SIP message (911 or urn:service:sos) to the first P-CSCF. Since the SIP message is associated with SMS text 911, the first P-CSCF may add an e911 attribute, such as an RPH with an esnet namespace, in the SIP message. As shown by reference number 404, the first P-CSCF may transmit the SIP message (RPH esnet) to the first S-CSCF. The first S-CSCF may transmit the SIP message to the first RCS-AS. As shown by reference number 406, the first RCS-AS may transmit the SIP message to the first S-CSCF. As shown by reference number 408, the first S-CSCF may transmit the SIP message to the I-CSCF. The S-CSCF may perform an enumerated (ENUM) query based on a target to determine an appropriate I-CSCF or I-SBC.

As shown by reference number 410, the I-CSCF may transmit the SIP message to the first I-SBC. As shown by reference number 412, the first I-SBC may transmit the SIP message to the second I-SBC. As shown by reference number 414, the second I-SBC may transmit the SIP message to the second S-CSCF. As shown by reference number 416, the second S-CSCF may transmit the SIP message to the second RCS-AS. As shown by reference number 418, the second RCS-AS may transmit the SIP message to the second S-CSCF. The second S-CSCF may transmit the SIP message to the second P-CSCF. The second P-CSCF may transmit the SIP message to the PSAP.

As shown by reference number 420, the PSAP may transmit an OK message (e.g., SIP 200 OK) to the second P-CSCF. The second P-CSCF may transmit the OK message to the second S-CSCF. The second S-CSCF may transmit the OK message to the second RCS-AS. As shown by reference number 422, the second RCS-AS may transmit the OK message to the second S-CSCF. As shown by reference number 424, the second S-CSCF may transmit the OK message to the second I-SBC. As shown by reference number 426, the second I-SBC may transmit the OK message to the first I-SBC. As shown by reference number 428, the first I-SBC may transmit the OK message to the I-CSCF. As shown by reference number 430, the I-CSCF may transmit the OK message to the first S-CSCF. As shown by reference number 432, the first S-CSCF may transmit the OK message to the first RCS-AS. As shown by reference number 434, the first RCS-AS may transmit the OK message to the first S-CSCF. As shown by reference number 436, the first S-CSCF may transmit the OK message to the first P-CSCF. As shown by reference number 438, the first P-CSCF may transmit the OK message to the UE.

As shown by reference number 440, the UE may transmit an ACK to the first P-CSCF. As shown by reference number 442, the first P-CSCF may transmit the ACK to the first S-CSCF. As shown by reference number 444, the first S-CSCF may transmit the ACK to the first RCS-AS. As shown by reference number 446, the first RCS-AS may transmit the ACK to the first S-CSCF. As shown by reference number 448, the first S-CSCF may transmit the ACK to the I-CSCF. As shown by reference number 450, the I-CSCF may transmit the ACK to the first I-SBC. As shown by reference number 452, the first I-SBC may transmit the ACK to the second I-SBC. As shown by reference number 454, the second I-SBC may transmit the ACK to the second S-CSCF. As shown by reference number 456, the second S-CSCF may transmit the ACK to the second RCS-AS. As shown by reference number 458, the second RCS-AS may transmit the ACK to the second S-CSCF. As shown by reference number 460, the second S-CSCF may transmit the ACK to the second P-CSCF. As shown by reference number 462, the second P-CSCF may transmit the ACK to the PSAP.

As indicated above, FIG. 4 is provided as an example. Other examples may differ from what is described with regard to FIG. 4. The number and arrangement of devices shown in FIG. 4 are provided as an example. In practice, there may be additional devices, fewer devices, different devices, or differently arranged devices than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) shown in FIG. 4 may perform one or more functions described as being performed by another set of devices shown in FIG. 4.

In some implementations, a STIR/SHAKEN framework may be supported for SIP messages to reduce spoofing of SMS text 911 at PSAP centers. By using the STIR/SHAKEN framework, SMS text 911 spoofing may be reduced, thereby reducing time wasted at the PSAP centers. When a text message is associated with SMS text 911, an originating service provider network may attest both a caller identity and an RPH (e.g., an RPH with an esnet namespace) indicated in a SIP message. The caller identity may be a P-Asserted Identity (PAID). A terminating IMS emergency network within a Next Generation emergency service complex may verify the caller identity and the RPH. An implementation of STIR/SHAKEN may be supported for the SIP message at both the originating service provider network and at the terminating IMS emergency network.

In some implementations, the support of STIR/SHAKEN may be applicable only to RCS based SMS architecture solutions and only to a Next Generation 911 (NG911) emergency service network. The NG911 emergency service network may be responsible for performing the verification of the signed caller identity and RPH information received within the SIP message. The NG911 emergency service network may pass an appropriate indication to a PSAP operator. When a validation/verification of the signed caller identity and the RPH information associated with the SMS text 911 fails, the SMS text 911 may be delivered to the PSAP with the caller identity and the RPH information, as well as a result of the validation/verification (e.g., an indication that the caller identity and/or the RPH information was not successfully verified). A separate indicator may be provided for the caller identity and the RPH information. No SMS text 911 may be impacted for a failed validation/verification.

Figure 5:
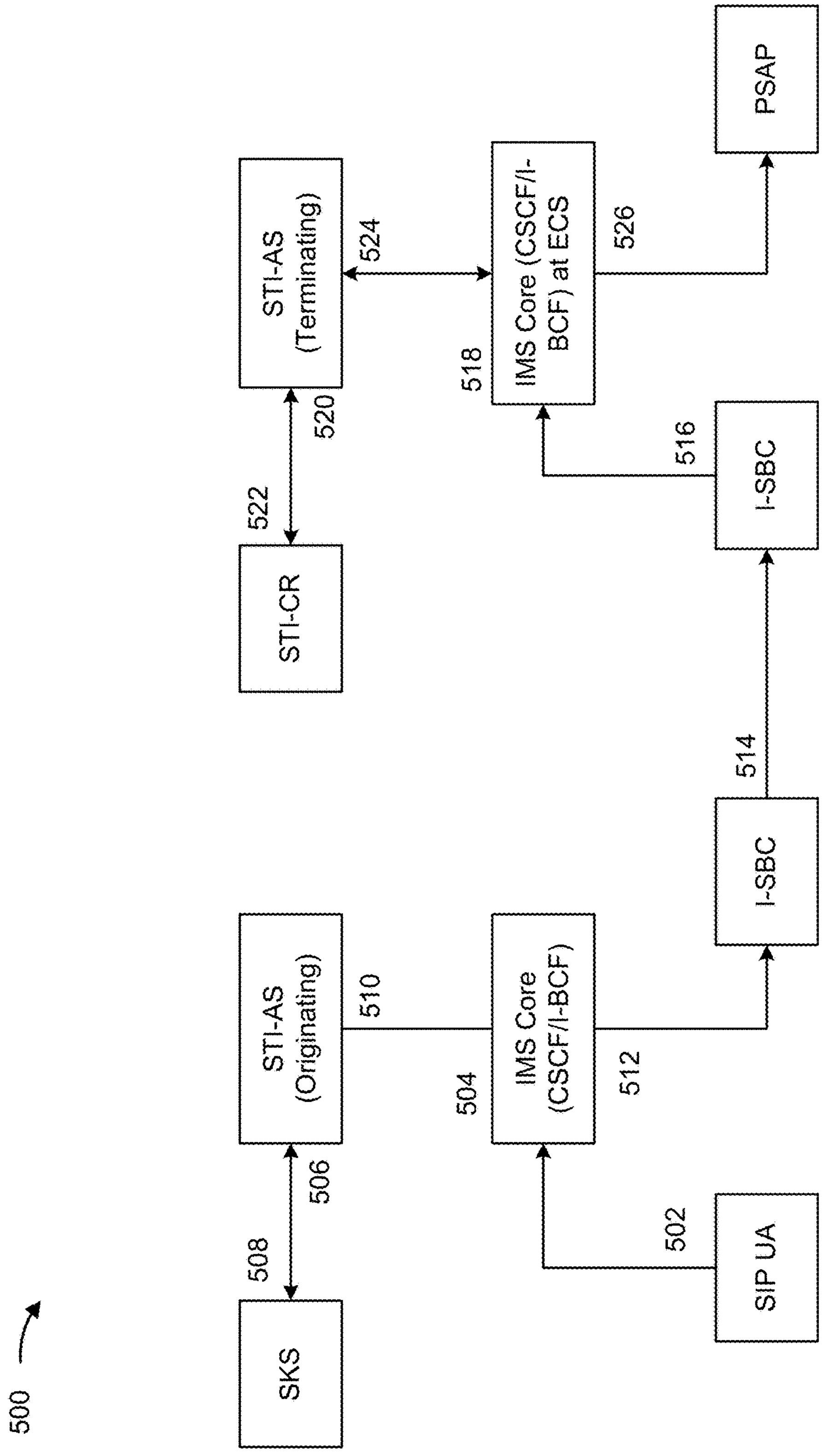
FIG. 5 is a diagram of an example associated with an architecture supporting SMS text 911 to prevent spoofing.

FIG. 5 is a diagram of an example 500 associated with an architecture supporting SMS text 911 to prevent spoofing. As shown in FIG. 5, example 500 includes a SIP user agent (UA), a first IMS associated with an originating S-CSCF or interconnect border control function (I-BCF) (S-CSCF/I-BCF), a secure telephone identity authentication service (STI-AS) (originating), a secure key store (SKS), a first I-SBC, a second I-SBC, a second IMS associated with a terminating S-CSCF/I-BCF, a secure telephone identity verification service (STI-VS) (terminating), a secure telephone identity certificate repository (STI-CR), and a PSAP. The architecture may be a STIR/SHAKEN and robot calling architecture. The architecture may be an Alliance for Telecommunications Industry Solutions (ATIS) based architecture.

As shown by reference number 502, the SIP UA may transmit, to the first IMS, a SIP message associated with SMS text 911. As shown by reference number 504, the originating CSCF/I-BCF may transmit a request to the STI-AS. The request may be to attest a caller identity and an RPH associated with the SIP message (e.g., an RPH with an esnet namespace). As shown by reference number 506, the STI-AS may send a query to the SKS, and as shown by reference number 508, the SKS may provide a reply to the STI-AS. As shown by reference number 510, the STI-AS may provide, to the first IMS, a response that includes an identifier for both the caller identity and the RPH. The identity may be associated with an attestation of the caller identity and the RPH. As shown by reference number 512, the first IMS may transmit the SIP message to the first I-SBC. The identifier for both the caller identity and the RPH may be inserted into the SIP message.

As shown by reference number 514, the first I-SBC may transmit the SIP message to the second I-SBC. As shown by reference number 516, the second I-SBC may transmit the SIP message to the second IMS. As shown by reference number 518, the terminating CSCF/I-BCF may transmit a request to the STI-VS. The request may indicate the identifier for both the caller identity and the RPH. As shown by reference number 520, the STI-VS may send a query to the STI-CR, and as shown by reference number 522, the STI-CR may provide a reply to the STI-VS. As shown by reference number 524, the STI-VS may provide, to the second IMS, a response that validates the identifier for both the caller identity and the RPH in the SIP message. As shown by reference number 526, the second IMS core may transmit the SIP message to the PSAP. The SIP message may indicate that both the caller identity and the RPH have been successfully validated. Alternatively, the SIP message may indicate that the caller identity and/or the RPH have not been validated (e.g., validation has failed).

In some implementations, attestation may be applied to both the caller identity and the RPH of the SIP message. The second IMS, which may be associated with an emergency complex, may become aware of the validity of the caller identity and the RPH in the SIP message. The second IMS may pass an appropriate indication to a PSAP operator (e.g., whether an SMS text 911 is potential spam or not). Further, either a CSCF or the I-BCF may perform a hypertext transfer protocol (HTTP) request to the STI-AS or the STI-VS.

As indicated above, FIG. 5 is provided as an example. Other examples may differ from what is described with regard to FIG. 5. The number and arrangement of devices shown in FIG. 5 are provided as an example. In practice, there may be additional devices, fewer devices, different devices, or differently arranged devices than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) shown in FIG. 5 may perform one or more functions described as being performed by another set of devices shown in FIG. 5.

Figure 6:
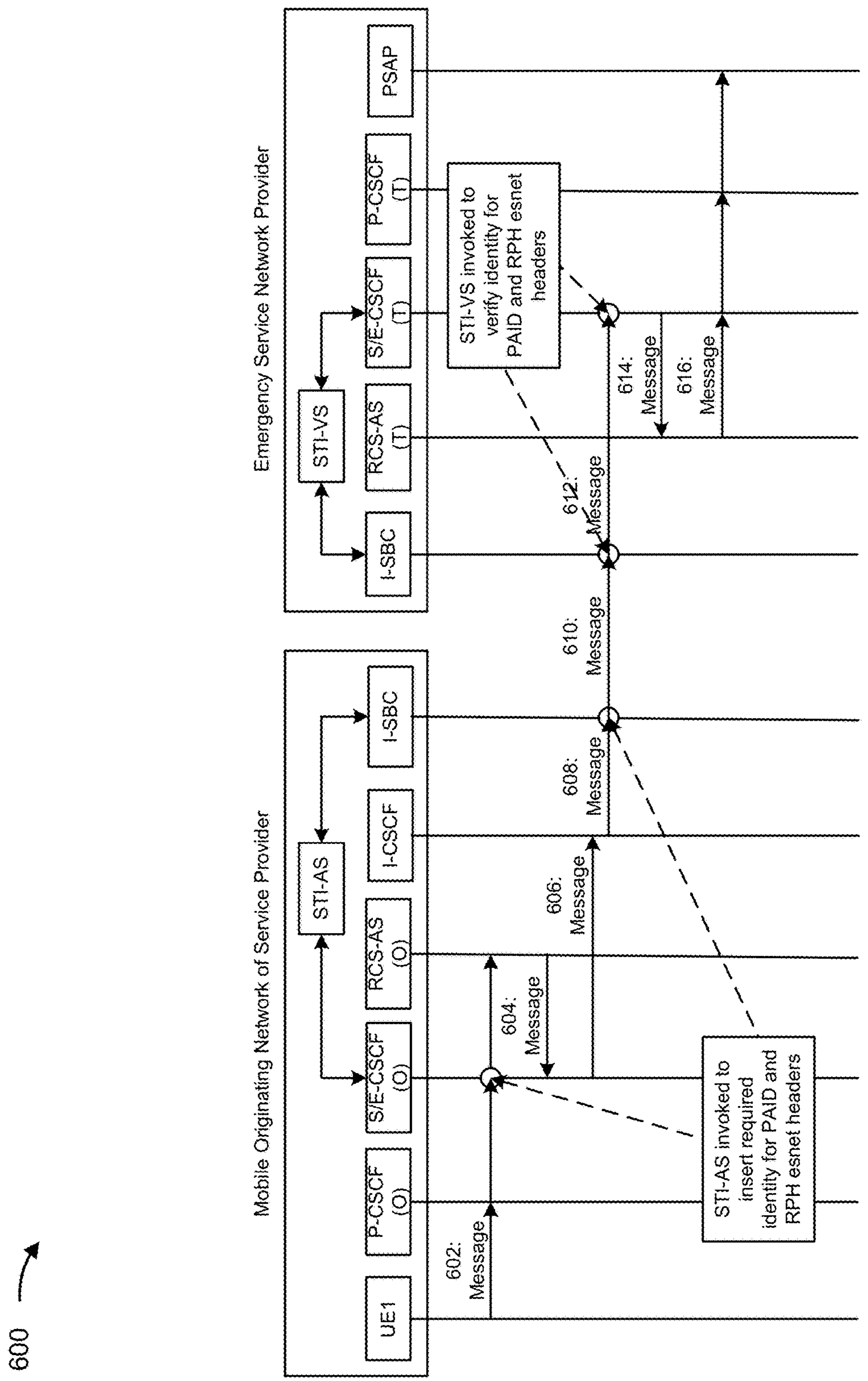
FIG. 6 is a diagram of an example associated with supporting secure telephone identity revisited/signature-based handling of asserted information using tokens (STIR/SHAKEN) for SIP messages to reduce spoofing of SMS text 911 at PSAP centers.

FIG. 6 is a diagram of an example 600 associated with supporting STIR/SHAKEN for SIP messages to reduce spoofing of SMS text 911 at PSAP centers. As shown in FIG.

6, example 600 includes a UE, a first P-CSCF, a first S-CSCF or first emergency CSCF (E-CSCF) (S/E-CSCF), a first RCS-AS, an interrogating CSCF (I-CSCF), and a first I-SBC, which may be associated with a mobile originating network of a service provider. Example 600 further includes a second I-SBC, a second RCS-AS, a second S/E-CSCF, a second P-CSCF, and a PSAP, which may be associated with an emergency service network provider.

As shown by reference number 602, the UE may transmit a SIP message to the first P-CSCF. Since the SIP message is associated with SMS text 911, the first P-CSCF may add an RPH with an esnet namespace in the SIP message. The first P-CSCF may transmit, to the first S/E-CSCF, the SIP message having the RPH with the esnet namespace. An STI-AS may be invoked by the first S/E-CSCF to perform attestation for both a caller identity and an RPH with an esnet namespace. The first S/E-CSCF may transmit the SIP message to the first RCS-AS. As shown by reference number 604, the first RCS-AS may transmit the SIP message to the first S/E-CSCF.

As shown by reference number 606, the first S/E-CSCF may transmit the SIP message to the I-CSCF. As shown by reference number 608, the I-CSCF may transmit the SIP message to the first I-SBC. The STI-AS may be invoked by the first I-SBC to perform attestation for both the caller identity and the RPH with the esnet namespace. In other words, the invocation of the STI-AS may be done at either the first S/E-CSCF or the first I-SBC. As shown by reference number 610, the first I-SBC may transmit the SIP message to the second I-SBC. The SIP message may indicate both the caller identity and the RPH with the esnet namespace. An STI-VS may be invoked by the second I-SBC to perform verification for both the caller identity and the RPH with an esnet namespace. As shown by reference number 612, the first I-SBC may transmit the SIP message to the second S/E-CSCF. The STI-VS may be invoked by the second S/E-CSCF to perform verification for both the caller identity and the RPH with an esnet namespace. In other words, the invocation of the STI-VS may be done at either the second I-SBC or the second S/E-CSCF. As shown by reference number 614, the second S/E-CSCF may transmit the SIP message to the second RCS-AS. As shown by reference number 616, the second RCS-AS may transmit the SIP message to the second S/E-CSCF. The second S/E-CSCF may transmit the SIP message to the second P-CSCF. The second P-CSCF may transmit the SIP message to the PSAP.

In some implementations, attestation may be a declaration made by a network operator associated with an originating network that a party placing a particular call is authorized to represent themselves by a particular calling identity. When verification of a signed caller identity or a SIP RPH associated with a 9-1-1 origination text passes, the 9-1-1 text may be delivered to the PSAP with the caller identity and the SIP RPH, along with results of the caller identity and RPH verification. In the case of successful verification, a corresponding verstat parameter may indicate that validation passed in a SIP message to the PSAP. When verification of the signed caller identity or the SIP RPH associated with the 9-1-1 origination text fails, the 9-1-1 text may be delivered to the PSAP with the caller identity and the SIP RPH, along with results of the caller identity and RPH verification. In the case of failure, the corresponding verstat parameter may indicate validation that failed in the SIP message to the PSAP.

As an example, the SIP message to the PSAP may indicate a PAID, a telephone number (TN), a verstat of "TN-Validation-Passed", an RPH of esnet, and a verstat of "TN-RPH-Validation-Passed". As another example, the SIP message to the PSAP may indicate a PAID, a telephone number, a verstat of "TN-Validation-Failed", an RPH of esnet, and a verstat of "TN-RPH-Validation-Failed".

As indicated above, FIG. 6 is provided as an example. Other examples may differ from what is described with regard to FIG. 6. The number and arrangement of devices shown in FIG. 6 are provided as an example. In practice, there may be additional devices, fewer devices, different devices, or differently arranged devices than those shown in FIG. 6. Furthermore, two or more devices shown in FIG. 6 may be implemented within a single device, or a single device shown in FIG. 6 may be implemented as multiple, distributed devices. Additionally, or alternatively, a set of devices (e.g., one or more devices) shown in FIG. 6 may perform one or more functions described as being performed by another set of devices shown in FIG. 6.

Figure 7:
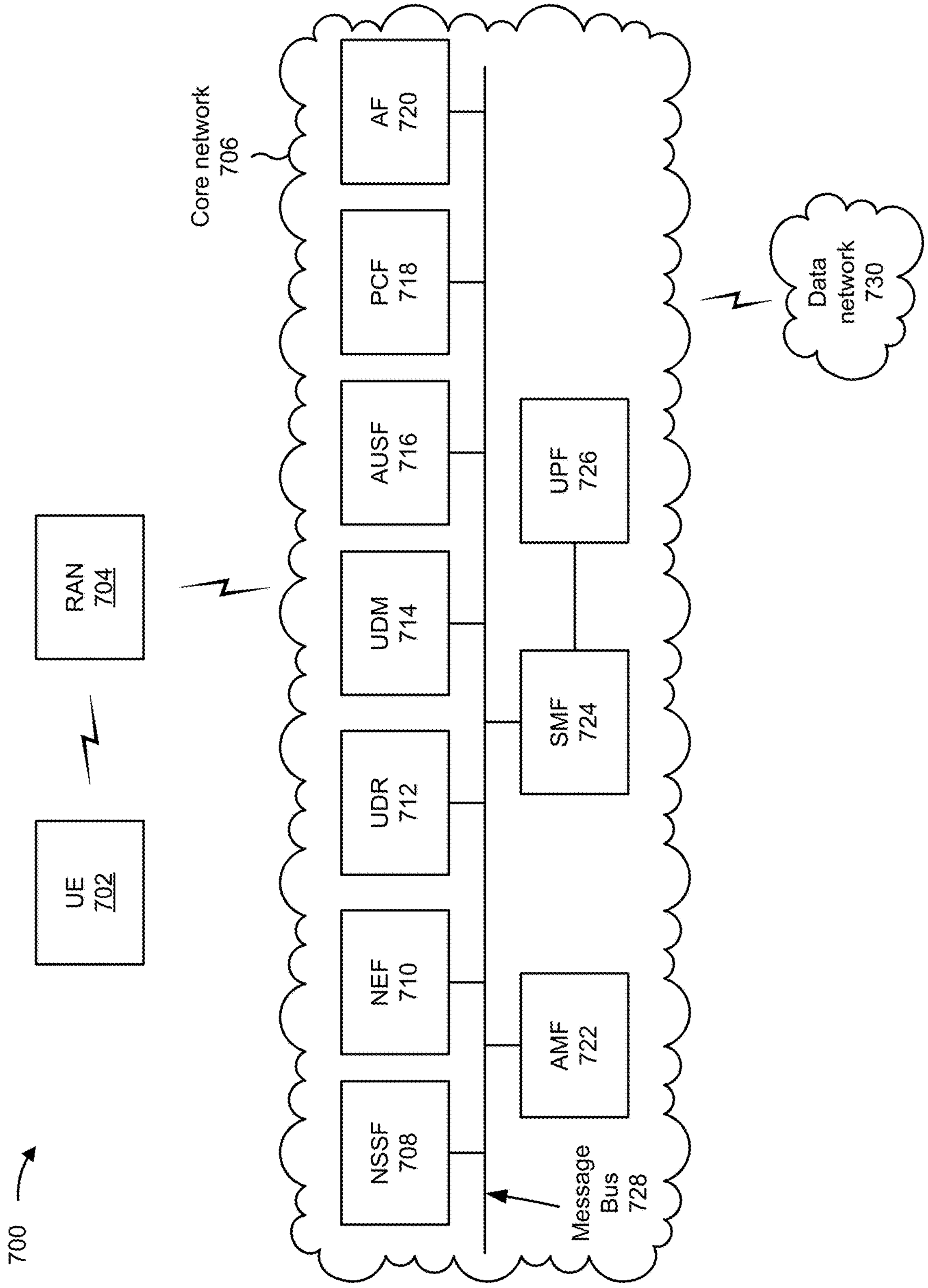
FIG. 7 is a diagram of an example environment in which systems and/or methods described herein may be implemented.

FIG. 7 is a diagram of an example environment 700 in which systems and/or methods described herein may be implemented. As shown in FIG. 7, example environment 700 may include a UE 702, a radio access network (RAN) 704, a core network 706, and a data network 730. Devices and/or networks of example environment 700 may interconnect via wired connections, wireless connections, or a combination of wired and wireless connections.

The UE 702 may include one or more devices capable of receiving, generating, storing, processing, and/or providing information, such as information described herein. For example, the UE 702 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

The RAN 704 may support, for example, a cellular radio access technology (RAT). The RAN 704 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for the UE 702. A base station may be a disaggregated base station. The disaggregated base station may be configured to utilize a protocol stack that is physically or logically distributed among two or more nodes, which may include a radio unit (RU), a distributed unit (DU), and a centralized unit (CU). The RAN 704 may transfer traffic between the UE 702 (e.g., using a cellular RAT), one or more base stations (e.g., using a wireless interface or a backhaul interface, such as a wired backhaul interface), and/or the core network 706. The RAN 704 may provide one or more cells that cover geographic areas.

In some implementations, the RAN 704 may perform scheduling and/or resource management for the UE 702 covered by the RAN 704 (e.g., the UE 702 covered by a cell provided by the RAN 704). In some implementations, the RAN 704 may be controlled or coordinated by a network controller, which may perform load balancing, network-level configuration, and/or other operations. The network controller may communicate with the RAN 704 via a wireless or wireline backhaul. In some implementations, the RAN 704 may include a network controller, a self-organizing network (SON) module or component, or a similar module or component. In other words, the RAN 704 may perform network control, scheduling, and/or network management functions (e.g., for uplink, downlink, and/or sidelink communications of the UE 702 covered by the RAN 704).

In some implementations, the core network 706 may include an example functional architecture in which systems and/or methods described herein may be implemented. For example, the core network 706 may include an example architecture of a 5G next generation (NG) core network included in a 5G wireless telecommunications system. While the example architecture of the core network 706 shown in FIG. 7 may be an example of a service-based architecture, in some implementations, the core network 706 may be implemented as a reference-point architecture and/or a 4G core network, among other examples.

As shown in FIG. 7, the core network 706 may include a number of functional elements. The functional elements may include, for example, a network slice selection function (NSSF) 708, a network exposure function (NEF) 710, a unified data repository (UDR) 712, a unified data management (UDM) 714, an authentication server function (AUSF) 716, a policy control function (PCF) 718, an application function (AF) 720, an AMF 722, a session management function (SMF) 724, and/or a UPF 726. These functional elements may be communicatively connected via a message bus 728. Each of the functional elements shown in FIG. 7 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

The NSSF 708 may include one or more devices that select network slice instances for the UE 702. The NSSF 708 may allow an operator to deploy multiple substantially independent end-to-end networks potentially with the same infrastructure. In some implementations, each slice may be customized for different services. The NEF 710 may include one or more devices that support exposure of capabilities and/or events in the wireless telecommunications system to help other entities in the wireless telecommunications system discover network services.

The UDR 712 may include one or more devices that provide a converged repository, which may be used by network functions to store data. For example, a converged repository of subscriber information may be used to service a number of network functions. The UDM 714 may include one or more devices to store user data and profiles in the wireless telecommunications system. The UDM 714 may generate authentication vectors, perform user identification handling, perform subscription management, and perform other various functions. The AUSF 716 may include one or more devices that act as an authentication server and support the process of authenticating the UE 702 in the wireless telecommunications system.

The PCF 718 may include one or more devices that provide a policy framework that incorporates network slicing, roaming, packet processing, and/or mobility management, among other examples. The AF 720 may include one or more devices that support application influence on traffic routing, access to the NEF 710, and/or policy control, among other examples. The AMF 722 may include one or more devices that act as a termination point for non-access stratum (NAS) signaling and/or mobility management, among other examples. The SMF 724 may include one or more devices that support the establishment, modification, and release of communication sessions in the wireless telecommunications system. For example, the SMF 724 may configure traffic steering policies at the UPF 726 and/or may enforce UE internet protocol (IP) address allocation and policies, among other examples. The UPF 726 may include one or more devices that serve as an anchor point for intra-RAT and/or inter-RAT mobility. The UPF 726 may apply rules to packets, such as rules pertaining to packet routing, traffic reporting, and/or handling user plane QoS, among other examples. The message bus 728 may represent a communication structure for communication among the functional elements. In other words, the message bus 728 may permit communication between two or more functional elements.

The data network 730 may include one or more wired and/or wireless data networks. For example, the data network 730 may include an IMS, a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or a combination of these or other types of networks.

The number and arrangement of devices and networks shown in FIG. 7 are provided as an example. In practice, there may be additional devices and/or networks, fewer devices and/or networks, different devices and/or networks, or differently arranged devices and/or networks than those shown in FIG. 7. Furthermore, two or more devices shown in FIG. 7 may be implemented within a single device, or a single device shown in FIG. 7 may be implemented as multiple, distributed devices. Additionally, or alternatively, a set of devices (e.g., one or more devices) of example environment 700 may perform one or more functions described as being performed by another set of devices of example environment 700.

Figure 8:
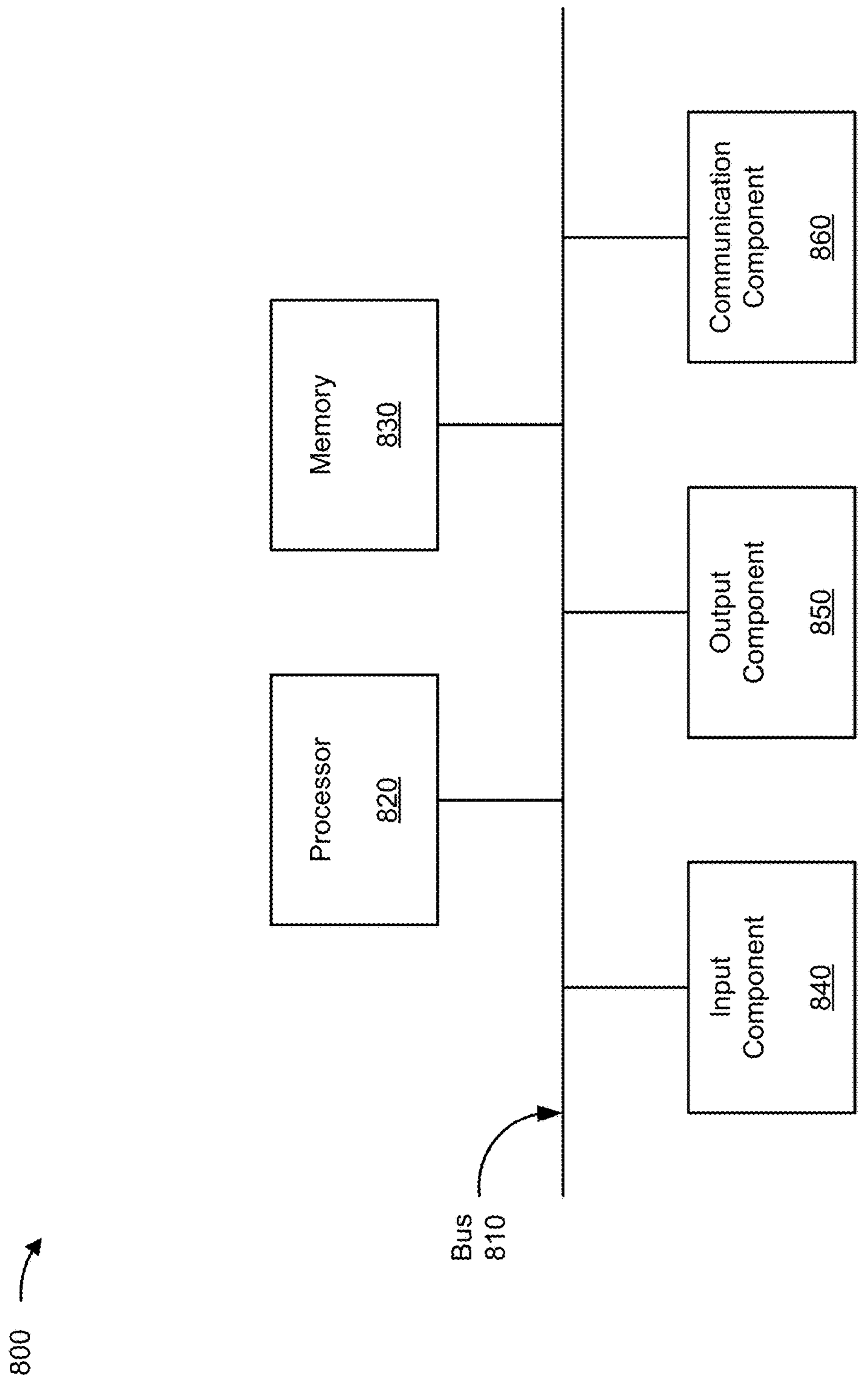
FIG. 8 is a diagram of example components of one or more devices of FIG. 7.

FIG. 8 is a diagram of example components of a device 800 associated with priority handling for SIP messages associated with text messages sent to an emergency number. The device 800 may correspond to a CSCF (e.g., CSCF 104). In some implementations, the CSCF may include one or more devices 800 and/or one or more components of the device 800. As shown in FIG. 8, the device 800 may include a bus 810, a processor 820, a memory 830, an input component 840, an output component 850, and/or a communication component 860.

The bus 810 may include one or more components that enable wired and/or wireless communication among the components of the device 800. The bus 810 may couple together two or more components of FIG. 8, such as via operative coupling, communicative coupling, electronic coupling, and/or electric coupling. For example, the bus 810 may include an electrical connection (e.g., a wire, a trace, and/or a lead) and/or a wireless bus. The processor 820 may include a central processing unit, a graphics processing unit, a microprocessor, a controller, a microcontroller, a digital signal processor, a field-programmable gate array, an application-specific integrated circuit, and/or another type of processing component. The processor 820 may be implemented in hardware, firmware, or a combination of hardware and software. In some implementations, the processor 820 may include one or more processors capable of being programmed to perform one or more operations or processes described elsewhere herein.

The memory 830 may include volatile and/or nonvolatile memory. For example, the memory 830 may include random access memory (RAM), read only memory (ROM), a hard disk drive, and/or another type of memory (e.g., a flash memory, a magnetic memory, and/or an optical memory). The memory 830 may include internal memory (e.g., RAM, ROM, or a hard disk drive) and/or removable memory (e.g., removable via a universal serial bus connection). The memory 830 may be a non-transitory computer-readable medium. The memory 830 may store information, one or more instructions, and/or software (e.g., one or more software applications) related to the operation of the device 800. In some implementations, the memory 830 may include one or more memories that are coupled (e.g., communicatively coupled) to one or more processors (e.g., processor 820), such as via the bus 810. Communicative coupling between a processor 820 and a memory 830 may enable the processor 820 to read and/or process information stored in the memory 830 and/or to store information in the memory 830.

The input component 840 may enable the device 800 to receive input, such as user input and/or sensed input. For example, the input component 840 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 850 may enable the device 800 to provide output, such as via a display, a speaker, and/or a light-emitting diode. The communication component 860 may enable the device 800 to communicate with other devices via a wired connection and/or a wireless connection. For example, the communication component 860 may include a receiver, a transmitter, a transceiver, a modem, a network interface card, and/or an antenna.

The device 800 may perform one or more operations or processes described herein. For example, a non-transitory computer-readable medium (e.g., memory 830) may store a set of instructions (e.g., one or more instructions or code) for execution by the processor 820. The processor 820 may execute the set of instructions to perform one or more operations or processes described herein. In some implementations, execution of the set of instructions, by one or more processors 820, causes the one or more processors 820 and/or the device 800 to perform one or more operations or processes described herein. In some implementations, hardwired circuitry may be used instead of or in combination with the instructions to perform one or more operations or processes described herein. Additionally, or alternatively, the processor 820 may be configured to perform one or more operations or processes described herein. Thus, implementations described herein are not limited to any specific combination of hardware circuitry and software.

The number and arrangement of components shown in FIG. 8 are provided as an example. The device 800 may include additional components, fewer components, different components, or differently arranged components than those shown in FIG. 8. Additionally, or alternatively, a set of components (e.g., one or more components) of the device 800 may perform one or more functions described as being performed by another set of components of the device 800.

Figure 9:
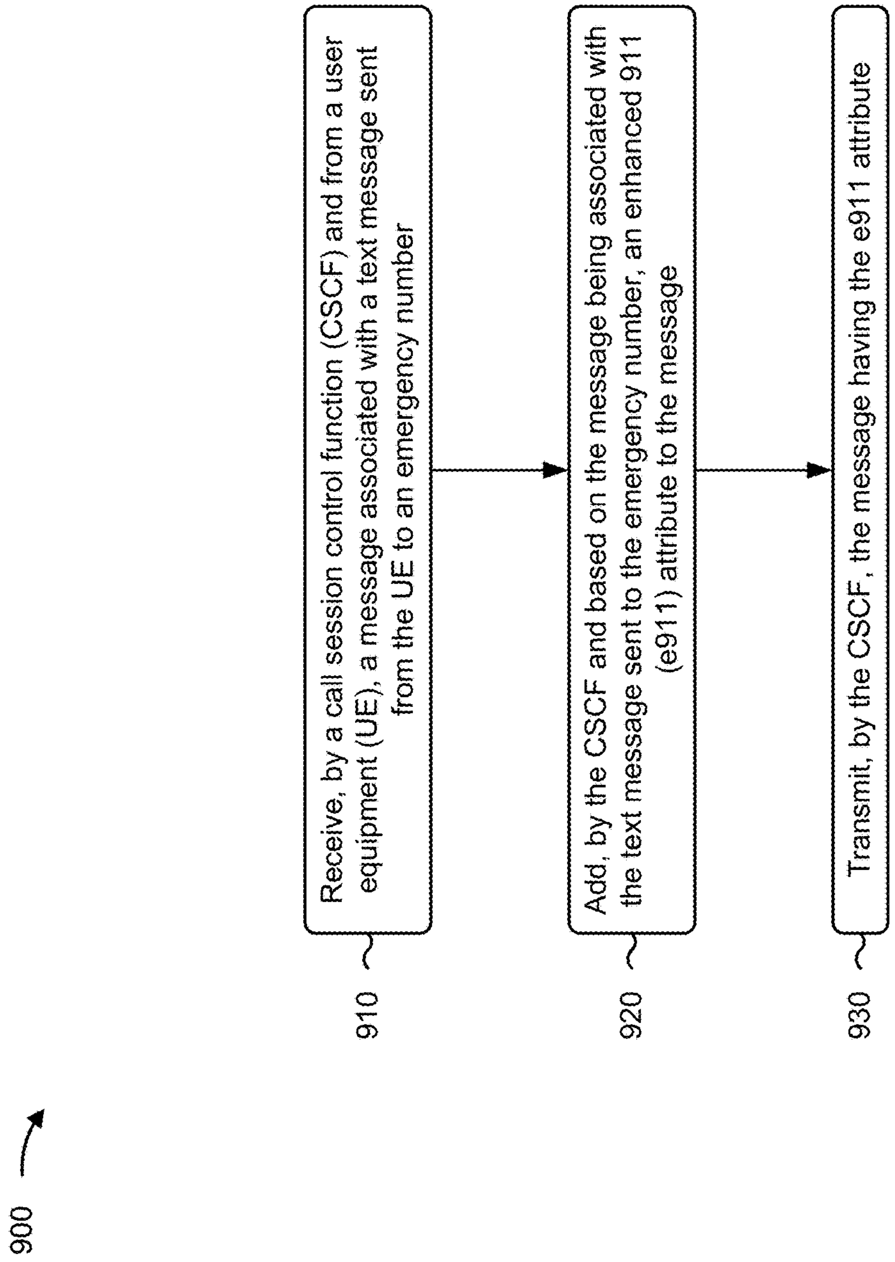
FIG. 9 is a flowchart of an example process associated with priority handling for SIP messages associated with text messages sent to an emergency number.

FIG. 9 is a flowchart of an example process 900 associated with priority handling for SIP messages associated with text messages sent to an emergency number. In some implementations, one or more process blocks of FIG. 9 may be performed by a CSCF. In some implementations, one or more process blocks of FIG. 9 may be performed by another entity or a group of entities separate from or including the CSCF. Additionally, or alternatively, one or more process blocks of FIG. 9 may be performed by one or more components of device 800, such as processor 820, memory 830, input component 840, output component 850, and/or communication component 860.

As shown in FIG. 9, process 900 may include receiving, by a CSCF and from a UE, a message associated with a text message sent from the UE to an emergency number (block 910). The CSCF may be included in a 4G network or in a 5G network. The text message may be associated with SMS text 911. The CSCF may be a P-CSCF. The message may be a SIP message.

As shown in FIG. 9, process 900 may include adding, by the CSCF and based on the message being associated with the text message sent to the emergency number, an e911 attribute to the message, wherein the e911 attribute provides prioritized handling for the message during network congestion in relation to messages without the e911 attribute (block 920). In other words, since the text message is associated with SMS text 911, the CSCF may add the e911 attribute to the message. The e911 attribute may be an RPH with an esnet namespace.

As shown in FIG. 9, process 900 may include transmitting, by the CSCF, the message having the e911 attribute (block 930). The CSCF may transmit the message to an SMS-AS. Alternatively, the CSCF may transmit the message to an RCS-AS. In other words, an ability to prioritize the message during the network congestion due to the e911 attribute may be applicable to both traditional SMS and RCS based architectures.

In some implementations, the CSCF may transmit, to an STI-AS, a request to attest a caller identity and the e911 attribute. The CSCF may receive, from the STI-AS, a response that includes an identifier associated with an attestation of the caller identity and the e911 attribute. The CSCF may insert the identifier associated with the attestation of the caller identity and the e911 attribute into the message. The attestation of the caller identity and the e911 attribute may be based on a STIR/SHAKEN framework, which may be implemented in an originating service provider network that includes the CSCF and a terminating IMS emergency network. Further, an indication associated with a validation of the identity associated with the attestation of the caller identity and the e911 attribute may be provided with the text message to a PSAP system, where the identity associated with the attestation of the caller identity and the e911 attribute may be validated using an STI-VS.

Although FIG. 9 shows example blocks of process 900, in some implementations, process 900 may include additional blocks, fewer blocks, different blocks, or differently arranged blocks than those depicted in FIG. 9. Additionally, or alternatively, two or more of the blocks of process 900 may be performed in parallel.

As used herein, the term “component” is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

receiving, by a call session control function (CSCF) and from a user equipment (UE), a message associated with a text message sent from the UE to an emergency number;

adding, by the CSCF and based on the message being associated with the text message sent to the emergency number, an enhanced 911 (e911) attribute to the message, wherein the e911 attribute provides prioritized handling for the message during network congestion in relation to messages without the e911 attribute;

transmitting, by the CSCF to a secure telephone identity authentication service (STI-AS), a request to attest a caller identity and the e911 attribute;

receiving, by the CSCF and from the STI-AS, a response that includes an identity associated with an attestation of the caller identity and the e911 attribute;

inserting, by the CSCF, the identity associated with the attestation of the caller identity and the e911 attribute into the message; and transmitting, by the CSCF, the message having the e911 attribute.

2. The method of claim 1, wherein the message is a session initiation protocol (SIP) message, and the e911 attribute is a resource priority header (RPH) with an emergency services network (esnet) namespace.

3. The method of claim 1, wherein transmitting the message having the e911 attribute comprises transmitting the message to a short messaging service application server (SMS-AS).

4. The method of claim 1, wherein transmitting the message having the e911 attribute comprises transmitting the message to a rich communication service application server (RCS-AS).

5. The method of claim 1, further comprising:

receiving, by the CSCF, a delivery acknowledgement or report indicating the e911 attribute.

6. The method of claim 1, wherein an indication associated with a validation of the identity associated with the attestation of the caller identity and the e911 attribute is provided with the text message to a public safety answering point (PSAP) system, and the identity associated with the attestation of the caller identity and the e911 attribute is validated using a secure telephone identity verification service (STI-VS).

7. The method of claim 1, wherein the attestation of the caller identity and the e911 attribute is based on a secure telephone identity revisited/signature-based handling of asserted information using tokens (STIR/SHAKEN) framework.

8. The method of claim 7, wherein the STIR/SHAKEN framework is implemented in an originating service provider network that includes the CSCF and a terminating Internet Protocol multimedia subsystem (IMS) emergency network.

9. A network element, comprising:

one or more processors configured to:

receive, from a user equipment (UE), a message associated with a text message sent from the UE to an emergency number;

add, based on the message being associated with the text message sent to the emergency number, an enhanced 911 (e911) attribute to the message, wherein the e911 attribute provides prioritized handling for the message during network congestion in relation to messages without the e911 attribute;

transmit, to a secure telephone identity authentication service (STI-AS), a request to attest a caller identity and the e911 attribute;

receive, from the STI-AS, a response that includes an identity associated with an attestation of the caller identity and the e911 attribute;

insert the identity associated with the attestation of the caller identity and the e911 attribute into the message; and transmit the message having the e911 attribute.

10. The network element of claim 9, wherein the e911 attribute is a resource priority header (RPH) with an emergency services network (esnet) namespace.

11. The network element of claim 9, wherein the one or more processors are configured to:

transmit the message having the e911 attribute to a short messaging service application server (SMS-AS).

12. The network element of claim 9, wherein the one or more processors are configured to:

transmit the message having the e911 attribute to a rich communication service application server (RCS-AS).

13. The network element of claim 9, wherein the one or more processors are further configured to:

receive a delivery acknowledgement or report with the e911 attribute.

14. The network element of claim 8, wherein the network element is a proxy call session control function (P-CSCF).

15. A non-transitory computer-readable medium storing a set of instructions, the set of instructions comprising:

one or more instructions that, when executed by one or more processors of a network element, cause the network element to:

receive, from a user equipment (UE), a message associated with a text message sent from the UE to an emergency number;

add, based on the message being associated with the text message sent to the emergency number, an enhanced 911 (e911) attribute to the message, wherein the e911 attribute provides prioritized handling for the message during network congestion in relation to messages without the e911 attribute;

transmit, to a secure telephone identity authentication service (STI-AS), a request to attest a caller identity and the e911 attribute;

receive, from the STI-AS, a response that includes an identity associated with an attestation of the caller identity and the e911 attribute;

insert the identity associated with the attestation of the caller identity and the e911 attribute into the message; and transmit the message having the e911 attribute.

16. The non-transitory computer-readable medium of claim 15, wherein the e911 attribute is a resource priority header (RPH) with an emergency services network (esnet) namespace.

17. The non-transitory computer-readable medium of claim 15, wherein the one or more instructions, when executed by the one or more processors, further cause the network element to:

transmit the message having the e911 attribute to a short messaging service application server (SMS-AS); or transmit the message having the e911 attribute to a rich communication service application server (RCS-AS).

18. The method of claim 1, wherein the message is a session initiation protocol (SIP) message that includes a P-Preferred-Identity header indicating a preferred identity corresponding to the caller identity, and wherein the CSCF converts the preferred identity to a P-Asserted-Identity header.

19. The network element of claim 9, wherein the message is a session initiation protocol (SIP) message that includes a P-Preferred-Identity header indicating a preferred identity corresponding to the caller identity, and wherein the one or more processors are configured to convert the preferred identity to a P-Asserted-Identity header.

20. The non-transitory computer-readable medium of claim 15, wherein the message is a session initiation protocol (SIP) message that includes a P-Preferred-Identity header indicating a preferred identity corresponding to the caller identity, and wherein the one or more instructions, when executed by the one or more processors, further cause the network element to convert the preferred identity to a P-Asserted-Identity header.

* * * * *